Nov. 26, 1940.                D. T. BROWN                2,222,975
                        RETRACTABLE LANDING GEAR
                    Filed Feb. 24, 1938        5 Sheets-Sheet 1

INVENTOR
DAYTON T. BROWN
BY
Robert W. Byerly
ATTORNEY

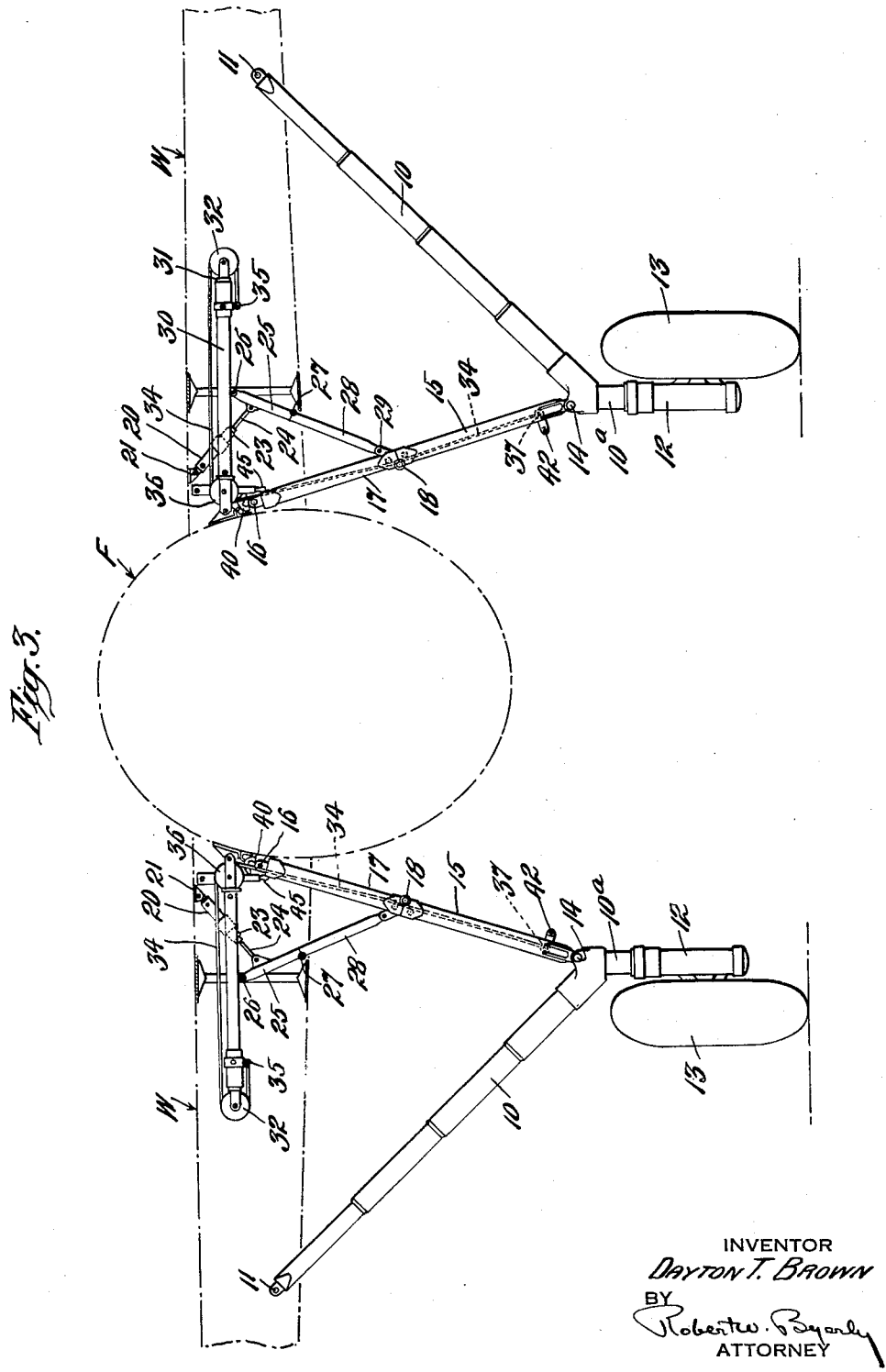

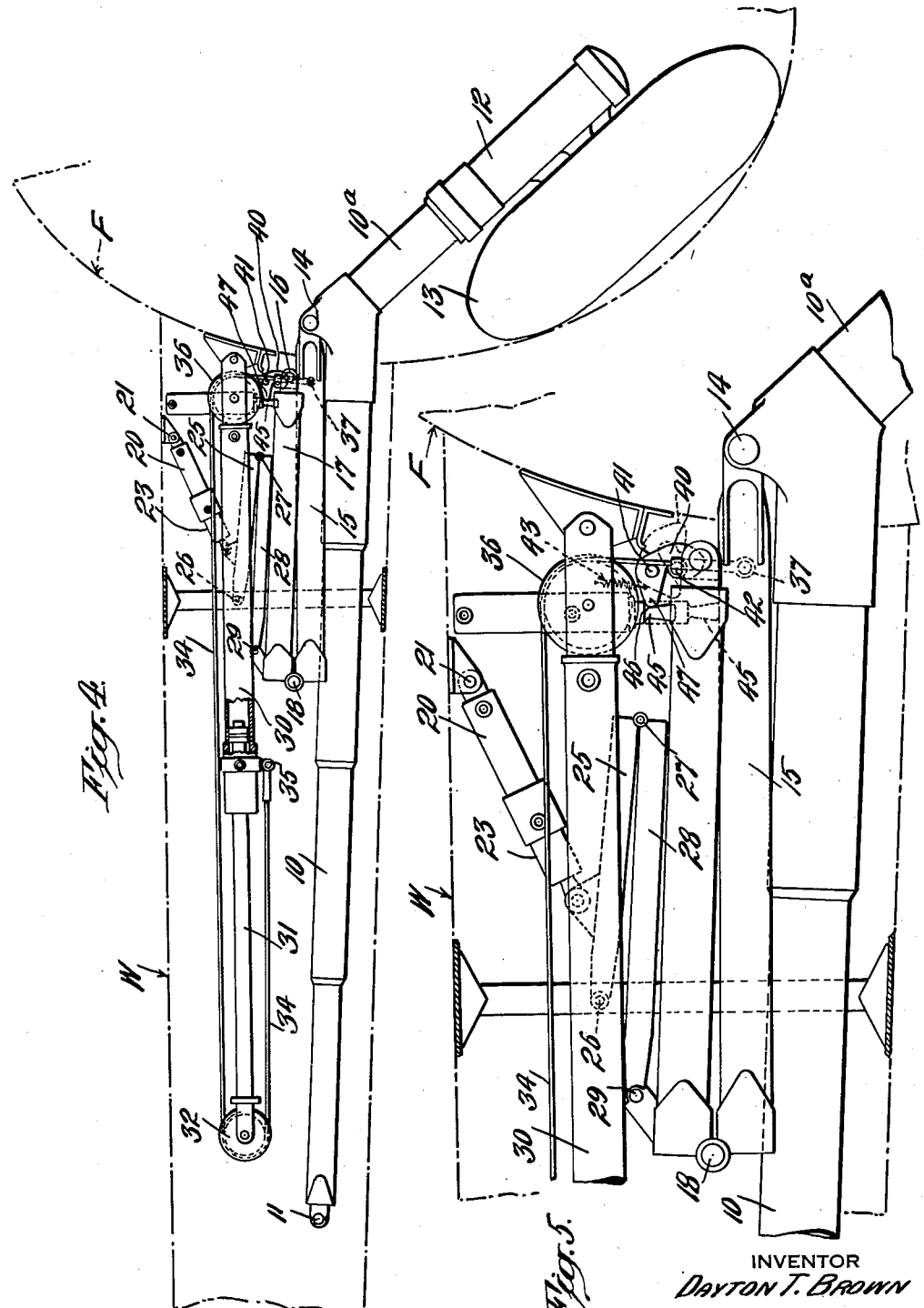

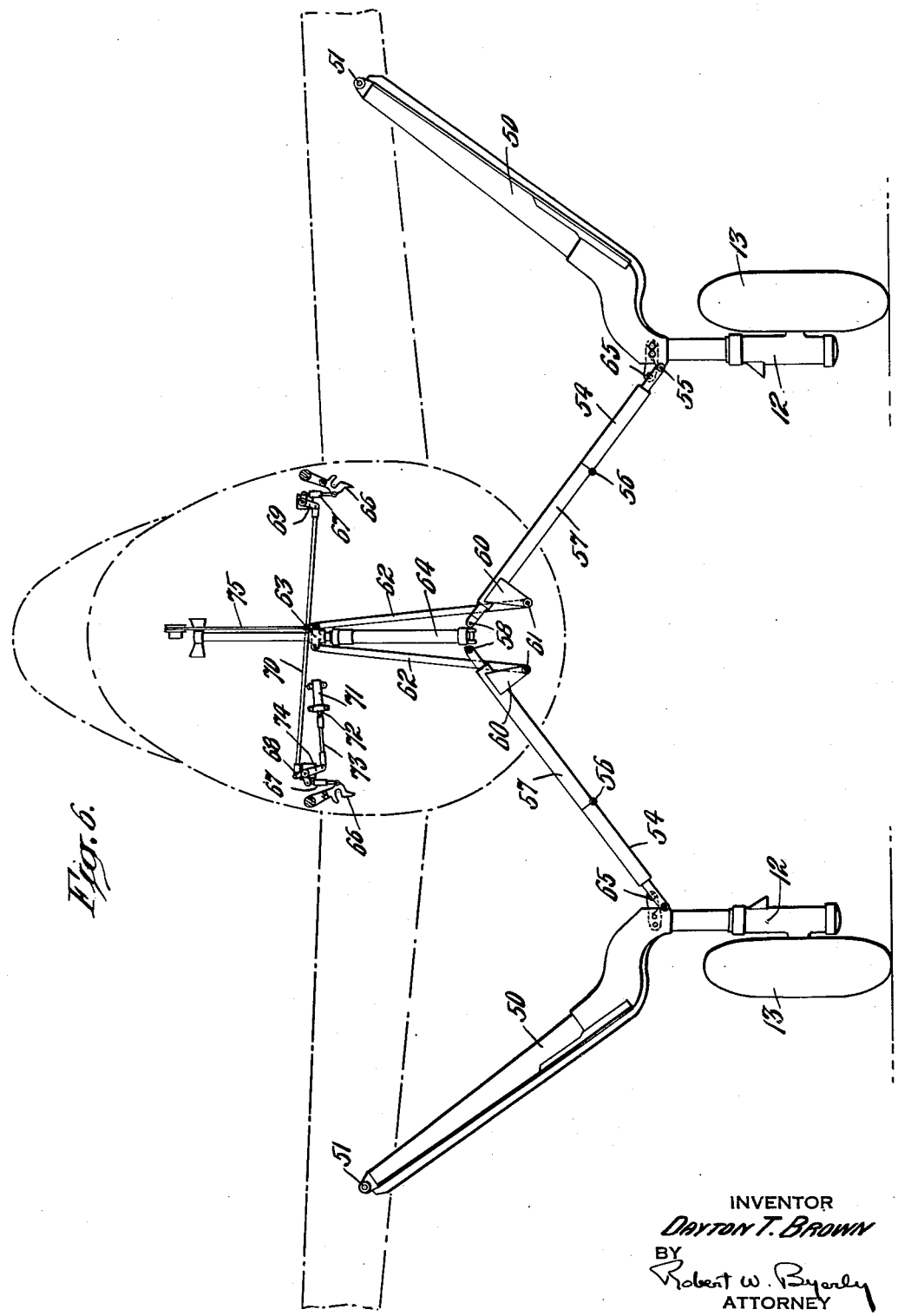

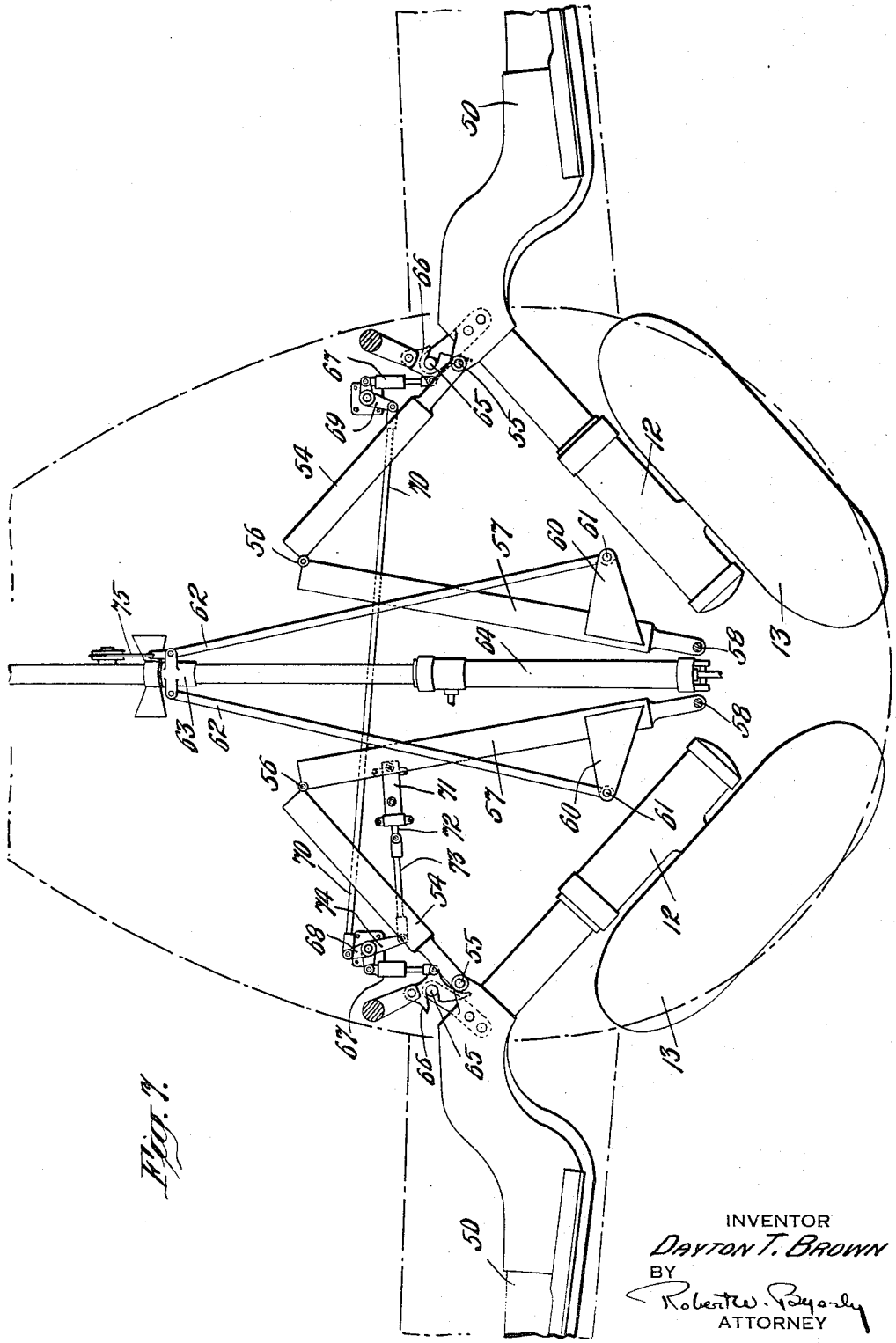

Patented Nov. 26, 1940

2,222,975

UNITED STATES PATENT OFFICE 2,222,975

RETRACTABLE LANDING GEAR

Dayton T. Brown, Manhasset, N. Y., assignor to Brewster Aeronautical Corporation, Long Island City, N. Y., a corporation of New York Application February 24, 1938, Serial No. 192,195

4 Claims. (Cl. 244—102)

This invention relates to improvements in retractable landing gear for airplanes.

The many and varied requirements of such gears make the problem of providing a satisfactory gear a difficult one. The gear must be rapid, positive and dependable in operation, so that the wheels can be retracted and lowered quickly, and without danger that they will stick in retracted or any intermediate position. The gear must be locked when in landing position and the wheels should have a wide tread. In retracted position the gear should be completely housed in order to obtain maximum lift and reduce drag to a minimum. The gear must be simple, compact, light, sturdy and dependable, with a minimum of operating parts.

The object of the invention is to provide an improved retractable landing gear which satisfies these requirements. This I have accomplished by pivoting rigid wheel struts on the wings at a considerable distance from the fuselage and by mounting the wheels on the ends of the struts and at an angle thereto, so that these struts form diagonal braces for the wheels when they are in landing position and place the wheels within the fuselage when the struts are swung to horizontal positions within the wings. This construction enables the wheels to swing rapidly into landing position by gravity. In addition, I provide toggle braces so secured to the struts that when the wheels drop into landing position the gear is automatically locked in that position. Mechanism associated with the toggle is provided for swinging the struts upward to retract the landing gear within the fuselage and wings.

Other objects and advantages of the present invention will become apparent in connection with the following detailed description of certain forms of the invention, reference being had to the accompanying drawings wherein:

Fig. 3 is a front elevation of the gear shown in Fig. 1;

Fig. 4 is a front elevation, on enlarged scale, showing the left-hand side of the gear in retracted position;

Fig. 5 is a view similar to Fig. 4, partly broken away, showing certain structural details;

Fig. 6 is a front elevation of a modified form of landing gear, also in accordance with the invention; and Fig. 7 is a view similar to Fig. 6, on enlarged scale, showing the gear in retracted position.

Figure 1:
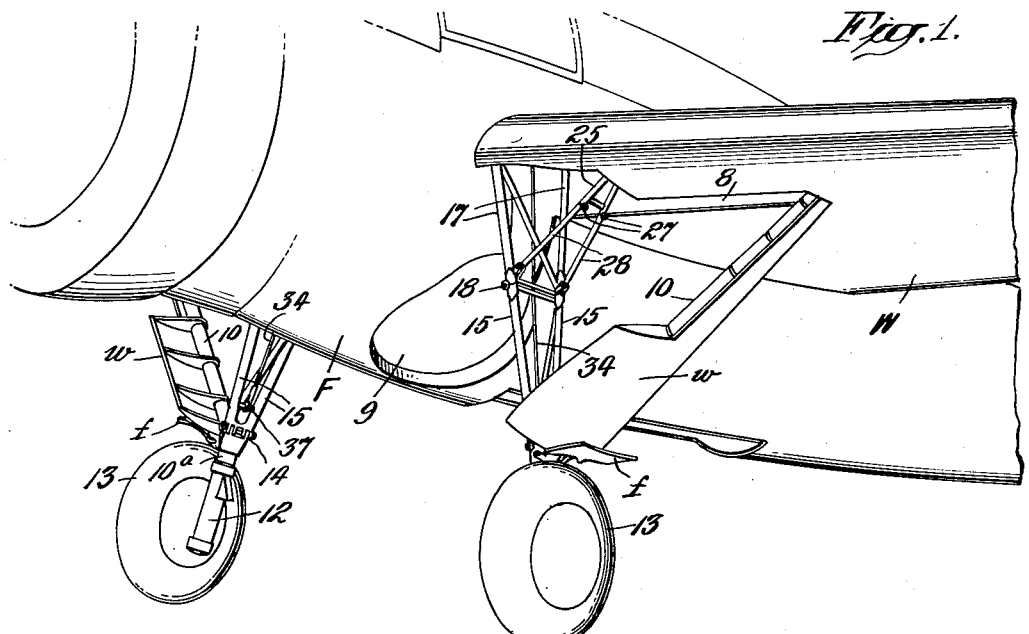
Fig. 1 is a perspective view of a portion of an airplane having a landing gear in accordance with the invention.

With reference to Figs. 1 to 5, there is shown diagrammatically at F the fuselage of an airplane, to which are secured wings W. In the form shown, the wings are of full cantilever construction, and are located at the mid-section of the fuselage, but it will be appreciated that the present landing gear may be applied to other types of construction. The gear shown for purposes of illustration comprises diagonal rigid struts 10 pivoted at their upper ends to any suitable portions of the wing structure at points 11 located a considerable distance from the fuselage. The struts 10 are preferably constructed in the form of dog legs, including rigid portions 10a which form fixed angles with the main portions of the struts, and extend vertically when the gear is in landing position. Secured to the lower ends of the struts 10 are conventional pneumatic shock absorbers 12, on the outer sides of which are mounted wheels 13. Recesses 8 are provided in wings for receiving the struts 10 and recesses 9 are provided in the fuselage for receiving the wheels 13. This construction thus enables the struts and wheels to be fully housed within the wings and fuselage, as best shown in Fig. 4, and also enables the gear to swing rapidly into landing position under the action of gravity.

Figure 2:
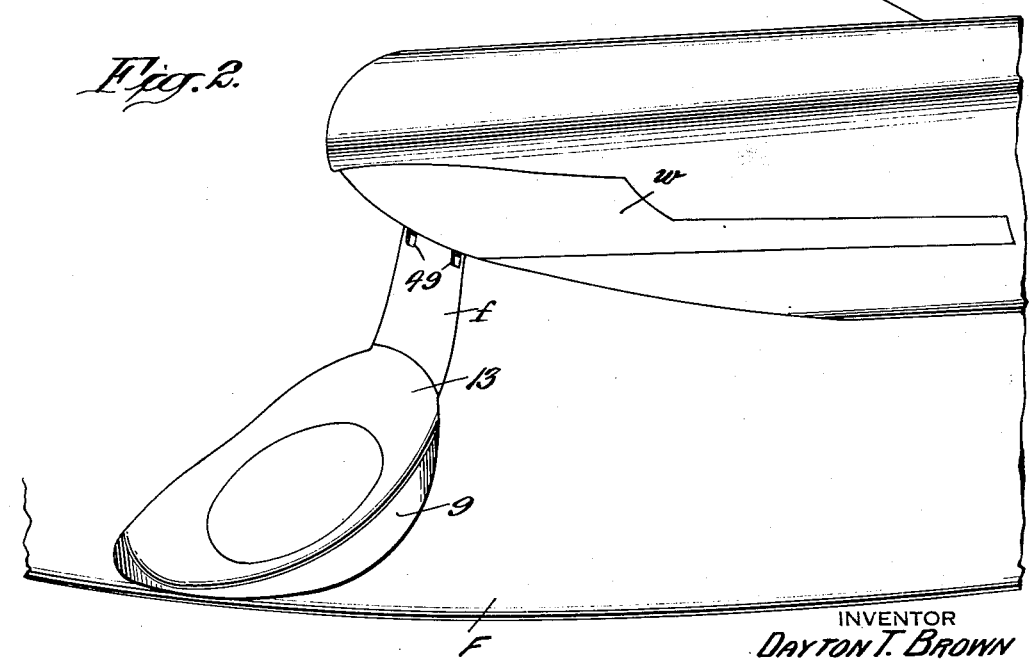
Fig. 2 is a perspective view of one side of the airplane, showing the gear in retracted position.

The above-described mounting of the struts 10 also enables the recesses 8 in the lower sides of the wings to be completely closed by fairing secured to these struts, so that no separate operating mechanism is required for this purpose, and so that minimum drag and maximum lift are obtained from the wings. As best shown in Figs. 1 and 2, fairing $w$ is firmly attached to each of the struts 10, the lower face of the fairing being arranged to lie flush with, and form a portion of, the lower surface of each wing. Attached to fairing $w$, for instance by spring hinges 49, are fairing sections $f$ adapted to close the upper portions of the recesses in the fuselage. Any suitable device may be used, if needed, to draw these sections into the fuselage wall. It will be observed that when the gear is in retracted position, as best shown in Figs. 2 and 4, the wheels practically fill the lower portions of these recesses and the outer sides of the wheels make the wall of the fuselage substantially continuous. If desired, however, the fairing $f$ may be of such extent as to entirely close these recesses in the fuselage.

In order to lock the gear in landing position, there are provided, in the preferred form of the construction, toggle braces comprising struts 15 which are pivoted to the struts 10, as indicated at 14, and struts 17 which are pivoted to the wing structure, as indicated at 16. The adjacent ends of the struts 15 and 17, at each side of the airplane, are pivoted to each other, as indicated at 18, to form a toggle joint. When the struts 10 swing into landing position the toggle joints 18 close automatically, so that each pair of struts 15 and 17 forms a diagonal brace for each strut 10. When these struts are to act as drag struts, they may be made of steel tubing, arranged in triangular shape, as best shown in Fig. 1.

The mechanism for retracting the gear is preferably hydraulically operated and comprises, as illustrated in Figs. 3 and 4, cylinders 20 pivoted to the wing structure, as shown at 21, and connected to a source of fluid pressure (not shown). Pistons 23 in cylinders 20 have extensions 24 connected to arms 25 which are pivoted at 26 to the wing structure and at 27 to arms 28, which, in turn, are pivoted at 29 to the lower ends of struts 17. The members 23, 25 and 28 form a second toggle arrangement which braces the struts 17 and 18. Rigidly secured to the wings are hydraulic cylinders 30 having pistons 31, to the outer ends of which are attached pulleys 32. Cables 34 run over the pulleys 32 and are clamped as shown at 35 to the cylinders 30. Adjacent the inner ends of the cylinders 30 there are mounted pulleys 36 over which the cables 34 run to the lower ends of the struts 15, where the ends of the cables are attached as indicated at 37. The cylinders 30 are attached to the same source of fluid pressure to which pistons 23 are connected, so that immediately the pistons 23 are retracted to break toggle joints 27 and 18, the pistons 31 are moved outwardly toward the wing wing tips, so that the cables 34 draw the landing gear upward until the parts assume the positions they occupy in Fig. 4.

In order to hold the landing gear in retracted position there are provided, as best shown in Fig. 5, latches 40 mounted on fixed pivots 41, and arranged to engage pins 42 attached to the lower ends of the struts 15 as best shown in Fig. 3. Springs 43 constantly urge the latches 40 into engaging position, so that when the gear is fully retracted, the latches automatically engage the pins 42.

Means are provided for insuring against the gear sticking in retracted position. For this purpose, there is preferably provided a combination release and kick-out device, comprising rods 45 having shoulders 46 adapted to strike arms 47 of the pivoted latches 40, when the rods are urged downwardly. The latches are thus swung out of engagement with the pins 42. Upon continued movement of the rods 45, their lower ends strike the struts 15, as shown in dotted lines in Fig. 5, and thus kick out the gear, which then drops of its own weight, into the open position shown in Fig. 3. Hydraulic pressure is applied to the appropriate side of piston 23 to insure the opening or closing of the toggle joints 27 and 18.

Referring now to Figs. 6 and 7, there is shown a form of landing gear which is similar to that shown in Figs. 1 to 5, but in which the mechanism for locking the gear in landing position is simplified, and in which both sides of the gear are operated by a single hydraulic unit. In this form of construction, dog-leg drag struts 50 are pivoted at their upper ends to the wing structure, as shown at 51, and mount wheels 13 through shock-absorbers 12, as described in connection with the first illustrative form of the gear. Struts 54 are pivoted at 55 to the lower ends of the struts 50, and are connected through toggle joints 56 to struts 57, the upper ends of which are pivoted as shown at 58 to the fuselage structure. Arms 60 are secured rigidly to the struts 57, and are pivoted at 61 to links 62 which are connected to the upper end of a piston 63. This piston is mounted in a hydraulic cylinder 64 which is connected to any suitable source of hydraulic pressure (not shown). When the piston 63 moves up to its position shown in Fig. 7, the links 62 first break the toggle joints 56, and then swing the struts 57 about their pivots 58, to draw the wheels into the recesses in the fuselage, and the struts 50 into the recesses in the wings. The struts 57 and 54 are thus folded into the fuselage. If desired, a cable 75 may be attached to the upper end of one of the links 62, and to an indicator in the pilot's cockpit, to indicate to the pilot whether the wheels are up or down.

In this form of gear, the means for holding the same in retracted position comprises latches 66 which are pivoted on the fuselage and which are adapted to engage pins 65 secured to the lower ends of struts 50. Mechanism is provided for engaging and disengaging the latches 66. In the form shown such means include links 67 which are connected to bell-crank 68 and crank 69, these cranks being interconnected by means of a rod 70. An arm 74, rigid with bell-crank 68, is connected through a link 73 to piston 72 of a hydraulic cylinder 71, which is connected to any suitable source of fluid pressure (not shown). The piston 72 is double-acting and by applying pressure to the proper side of the piston the latches 66 may be engaged or disengaged as desired.

The landing gear shown in Figs. 6 and 7 operates on the same principle as the form of construction previously described. When the latches 66 are released, and the pressure is removed from the bottom of piston 63, the wheels drop to their landing position, and the toggle joints 56 close, so that the struts 54 and 57, at each side, form rigid braces which hold the gear in open position. The piston 63 is double-acting, so that a downward pressure can be applied to the links 62, to insure closing of the toggle joints between struts 54 and 57. This form of gear is also provided with fairing like that shown in Fig. 1.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

What I claim is:

1. A retractable landing gear for airplanes, comprising wheels at either side of the fuselage, struts attached to said wheels and adapted to swing in a plane transverse to the longitudinal axis of the airplane, struts connected to the first-named struts and including toggle joints, and a unitary hydraulic device operatively connected with both the second-named struts and constructed and arranged to break the toggle joints and raise the gear to retracted position.

2. A landing gear for an airplane, comprising a rigid triangular truss consisting of a part of the frame of the airplane and two struts pivoted together near their lower ends and having their upper ends pivoted at fixed points on and transversely of the frame of the airplane, both of the struts being inclined to the vertical so that they share in supporting the weight of the airplane and are both placed in compression by the weight of the airplane and one of the struts being a toggle which is self-locking under endwise compressive strain, a portion of one of said struts extending downwardly below the pivot connecting the struts together and at an angle to the rest of the strut, shock-absorbing means for mounting a wheel for travel lengthwise of said downwardly extending portion, whereby sidewise motion of said wheel is avoided, and means for breaking the toggle and retracting the gear.

3. A landing gear for an airplane, comprising a rigid triangular truss consisting of a part of the frame of the wing of the airplane, a rigid one-piece strut having its upper end pivoted to the wing of the airplane at a distance from the axis of the airplane and a second strut having its upper end pivoted to the frame of the airplane near the axis thereof and its outer end pivoted to the first strut near its lower end, the second strut being a toggle which is self-locking under endwise compressive strains and the two struts being inclined to the vertical so that they share in supporting the weight of the airplane and are both placed in compression by the weight of the airplane, a wheel resiliently mounted on the first strut below the point at which it is pivoted to the second strut, and means for breaking the toggle and retracting the gear, a wing and the body of the airplane containing recesses to receive the gear and the wheel when the gear is retracted.

4. A landing gear for an airplane, comprising a truss extending across the airplane under its fuselage and part of its wings, having the form of a W and consisting of two rigid struts pivoted to the wings and inclined inward and downward from their pivot points, two toggle struts pivoted at closely adjacent points on the fuselage and inclined outward and downward from their pivot points, the lower end of each toggle strut being pivoted to the lower end of the adjacent rigid strut, wheels mounted at the apices of the truss, and means for breaking the toggles and retracting the gear.

DAYTON T. BROWN.